US008586925B2

(12) United States Patent
Willden

(10) Patent No.: US 8,586,925 B2
(45) Date of Patent: Nov. 19, 2013

(54) ULTRA-LOW-POWER OCCUPANCY SENSOR

(76) Inventor: Jeremy P. Willden, Pleasant Grove, UT (US)

( * ) Notice: Subject to any disclaimer, the term of this patent is extended or adjusted under 35 U.S.C. 154(b) by 0 days.

(21) Appl. No.: 13/153,390

(22) Filed: Jun. 3, 2011

(65) Prior Publication Data

US 2011/0297830 A1 Dec. 8, 2011

Related U.S. Application Data

(60) Provisional application No. 61/351,143, filed on Jun. 3, 2010.

(51) Int. Cl.
*G01J 5/10* (2006.01)

(52) U.S. Cl.
USPC .......... 250/338.1

(58) Field of Classification Search
USPC .......... 250/338.1
See application file for complete search history.

(56) References Cited

U.S. PATENT DOCUMENTS 4,713,598 A * 12/1987 Smith .......... 323/245
4,967,083 A * 10/1990 Kornbrekke et al. .......... 250/341.7
5,499,016 A * 3/1996 Pantus .......... 340/555
5,640,143 A 6/1997 Myron et al.
5,764,146 A 6/1998 Baldwin et al.
7,123,139 B2 10/2006 Sweeney
7,471,334 B1 12/2008 Stenger
2007/0040676 A1* 2/2007 Bandringa et al. .......... 340/567
2007/0114414 A1* 5/2007 Parker et al. .......... 250/338.3
2008/0093552 A1* 4/2008 Gorman et al. .......... 250/338.1
2008/0142716 A1* 6/2008 Wong et al. .......... 250/338.1
2009/0027574 A1* 1/2009 Edwards .......... 349/1

* cited by examiner

*Primary Examiner* — Marcus Taningco
(74) *Attorney, Agent, or Firm* — Angus C. Fox, III

(57) ABSTRACT

Passive IR sensor detection circuitry is provided that consumes eighty to ninety percent less power than conventional PIR sensor detection circuitry. Whereas prior art PIR sensor detection circuitry employs multiple amplification stages, to boost the power of the weak sensor signal, and a window comparator to determine whether an occupancy condition exists, the present invention uses, at most, a single amplification stage and no window comparator. In place of multiple amplification stages and a window comparators, the PIR sensor circuitry of the present invention uses a sensitive microcontroller to both detect and process the signal. A peak detector can be added just before the signal—whether amplified or not—is received by the microcontroller. Decay time of the peak detector is adjusted so that the signal will not substantially decay between measurements.

19 Claims, 3 Drawing Sheets

ULTRA-LOW-POWER OCCUPANCY SENSOR

This application has a priority date based on Provisional Patent Application No. 61/351,143, which has a filing date of Jun. 3, 2010, and is titled ULTRA-LOW POWER OCCUPANCY SENSOR.

BACKGROUND OF THE INVENTION

1. Field of the Invention

The present invention generally relates to passive infrared (PIR) motion detectors and, more particularly, to low-power PIR motion detectors having no more than one amplification stage and no window comparator.

2. History of the Prior Art

Infrared (IR) radiation is electromagnetic radiation having a wavelengths that are longer than those of visible light and shorter than those assigned to microwave radiation. IR radiation is assigned wavelengths between 0.7 and 300 μm, which equates to a frequency range of approximately 1 to 430 teraherz. Bright sunlight provides an irradiance of just over 1 kilowatt per square meter at sea level. Of this energy, 527 watts is infrared radiation, 445 watts is visible light, and 32 watts is ultraviolet radiation. Although IR radiation cannot be seen by most animals, it can be detected as heat. Snakes of the pit viper family have a unique pit between the eye and nostril on each side of the head that senses IR radiation. All warm-blooded animals, including humans, emit IR radiation. Humans, for example, emit IR radiation having a peak frequency of 9.4 μm. The heat-sensing organs of the pit vipers enable them to locate warm-blooded prey even in total darkness. The pit viper brain sees the IR images from the pits superimposed on the visible image from its eyes.

Pyroelectricity (from the Greek pyr, fire, and electricity) is the ability of certain materials to generate a temporary voltage when they are heated or cooled. Although artificial pyroelectric materials have been manufactured in recent years, the pyroelectric effect was first discovered by Theophrastus, who noted around 314 BC that tourmaline (essentially sodium aluminum borosilicate) attracted bits of straw and ash when heated. The pyroelectric effect is also present in both bone and tendon, as well as in certain tissues within the IR-sensing pits of the viper.

Pyroelectric infrared radiation sensors—both man made, as well as those of the pit vipers—are made of non-centrosymmetric (i.e., not having a center of symmetry), piezoelectric, polar (i.e., having a dipole in each crystal unit) crystalline materials. These materials generate a transitory voltage when heated or cooled. Under static conditions, polar crystalline materials do not display a net dipole moment, as the material's intrinsic dipole moment is neutralized by "free" electric charge that builds up on the surface by internal conduction or from the ambient atmosphere. Polar crystals only reveal their pyroelectric nature when subjected to a change in temperature that momentarily upsets the balance with the compensating surface charge. The change in temperature slightly modifies the positions of the atoms within the crystal structure, such that the polarization of some of the crystals reverses, resulting in a net dipole moment. This reversal of polarization gives rise to a voltage across the crystal. If the temperature stays constant at the new value, the pyroelectric voltage gradually disappears due to leakage current (the leakage can be caused by a variety of factors, including electrons moving through the crystal, ions moving through the air, or current leaking through a voltmeter attached across the crystal).

Passive infrared (PIR) motion detectors have been in use for decades for security and energy saving applications. Manufacturers of the pyroelectric sensor components publish recommended circuitry for amplifying and conditioning the minute electrical signal to a usable level. These reference circuits require substantial signal gain (thousands of times amplification) and typically require multiple stages of amplification. After amplification, the circuits use a window comparator (a pair of comparators to monitor if the signal has exceeded a certain range) to convert the analog signal into a digital signal which indicates occupancy. For some prior art devices, the signal is processed by a microprocessor in order to determine whether the signal indicates the presence of humans or pets, or between benign occupancy and a security breach caused by an intrusion. Thus, signals from PIR sensors are processed only after they have been amplified in order to determine whether certain conclusions can be drawn from the characteristics which the signal possesses. Signals from PIR sensors have, heretofore, not been processed without first subjecting them to multiple high-gain amplification stages and the use of at least one window comparator.

U.S. Pat. No. 5,764,146 to John R. Baldwin, et al. discloses a multifunction passive infrared occupancy sensor that functions as an occupancy sensor for both security intrusion alert and for energy management control systems. U.S. Pat. No. 5,640,143 to Douglas D. Myron, et al. discloses an occupancy sensor that provides improved performance by the inclusion of a microprocessor which controls the sensing transducers and processes the received signal to optimize desired detection performance. The sensor includes a quadrature detection technique and automatic sensitivity adjustment that reduces false detection caused by air flow, hallway traffic and other noise sources. U.S. Pat. No. 7,123,139 to Kevin Sweeney discloses an occupancy sensor for determining whether a room is occupied. The sensor integrates a battery-powered PIR motion detector and a battery-powered Hall Effect switch, each of which communicates wirelessly with a controller. U.S. Pat. No. 7,471,334 to Thomas A. Stenger discloses an outdoor, battery-powered digital camera that includes a passive infrared motion detector that allows the camera to be left unattended, as the detector automatically triggers the camera to take a picture upon sensing the presence of a moving animal. To prolong battery life, the camera goes into a power-saving sleep mode between pictures. The camera's exposure settings are periodically checked, adjusted and stored so that it can take a picture with a fairly recent exposure setting when suddenly awakened by the motion detector.

FIG. 1 is a diagram of typical prior-art general purpose motion detector circuit 100. It uses a low-cost LM324 quad operational amplifier as both a two stage amplifier (IC1A and IC1B) and a window comparator (IC1C and IC1D). Suggested component values are as follows: R1=10KΩ; R2=100KΩ; R3=10KΩ; R4=1 MΩ; R5=1 MΩ; R6=1 MΩ; R7=1 MΩ; R8=1 MΩ; R9=1 MΩ; R10=1 MΩ; R11=10KΩ; R12=10KΩ; C1=10 μf; C2=10 μf; C3=0.1 μf; C4=10 μf; C5=0.1 μf; and C6=1 μf. PIR sensor 101 is connected directly to ground through terminal 2. It is also connected to Vcc at terminal 1. C1 and R1 act as filters between the PIR sensor 101 and Vcc, as even tiny fluctuations in Vcc could perturb the PIR sensor, thereby causing output fluctuations that might well result in false occupancy detection. R2 continually pulls node 2 toward ground so that drops in the sensor output can be sensed by IC1A. Operational amplifiers (op-amps) 1C1A and 1C1B have a gain of 100 each, for a total gain of 10,000. As long as PIR sensor 101 detects no change in IR radiation intensity, operational amplifier IC1A is in a steady state condition, with the voltages at nodes 3, 4 and 5 being roughly equal to the output of the sensor 101, which is typically about 1 volt. However, when the voltage on node 3 changes in response to a change in detected IR radiation intensity by sensor 101, node 5 will reflect a 100-fold signal gain as IC1C attempts to equalize the voltage at nodes 3 and 4. The gain at node 5 is set by the ratio of R3 to R4, which together form a voltage divider. Resistor R5 and capacitor C4 together act to block the DC component of the output signal at node 5. The function of op-amp IC1B is analogous to that of op-amp IC1A. Because the resistance values of resistors R6 and R7 are the same and diodes D1 and D2 have identical threshold voltages, the voltage at node 8 (the non-inverting input of op-amp IC1D) is at Vcc/2. Diodes D1 and D2 are selected so that node 7 is held at 200 millivolts above Vcc and node 9 is held at 200 millivolts below Vcc. Op-amps IC1C and IC1D form a window comparator that responds to signals above 200 millivolts above and 200 millivolts below Vcc/2. This 400 millivolt-wide window is set by the low-current threshold-voltage drops across D1 and D2. In a steady state condition, the output of op-amp IC1B (node 10) is at Vcc/2. However, when the inverting input to op-amp IC1B (node 6) varies sufficiently so that node 10 is outside the 400 millivolt-wide window, the op-amps IC1C and IC1D of the window comparator trip and provide outputs at either node 11 or node 12, either of which is transferred to node 13 through diodes D3 or D4, respectively. Diode D3 isolates node 11 from node 13, and diode D4 isolates node 12 from node 13, thereby preventing unwanted cross-interference between IC1C and IC1D. In any case, diodes D3 and D4 pass only positive transitions into pin 4 of CD4538 CMOS single shot IC2. A timed output on pin 6 of IC2 feeds into NPN transistor Q1, which drives relay RY1. Resistor R10 and capacitor C6 set the time constant that determines how long the relay remains energized after motion is detected. Diode D5 protects IC2 from unsafe voltages generated by the collapse of the magnetic field of the solenoid of relay RY1 when transistor Q1 shuts off the current thereto. All components can operate on 5 to 12 volts. This type of circuit is often used to turn a light on outside a house when motion is detected.

Each stage of signal amplification consumes electrical power. In a line-powered or even many battery-powered devices, the amount of energy required for signal amplification is low enough so as to be negligible. However, in an energy-harvesting system operated by solar power, by a cell or battery charged intermittently by solar power, or simply by a cell or battery, the energy consumed by signal amplification circuitry overwhelms all other energy expenditures in the circuitry. If power-hungry amplification and comparator stages could be eliminated, battery life and operational time during periods of darkness could be extended significantly, with the added benefit of concomitant reduction in system cost and complexity.

The technology disclosed in this application has been incorporated into wireless control products produced by Ad Hoc Electronics LLC under the ILLUMRA trademark. Ad Hoc Electronics, a member of the EnOcean Alliance, has become the largest supplier in North America, of self-powered, battery-free, wireless lighting control and energy management systems. EnOcean GmbH of Oberhaching, Germany is a pioneer in the design and manufacture of energy-harvesting switching and sensor modules. EnOcean's primary technological contribution was the creation of wireless switches and radio modules which operate with minuscule amounts of energy. As a result of this breakthrough, energy-harvesting wireless sensors, of the type produced by EnOcean and its partners, can work where those based on other technologies fail. Energy-harvesting wireless switches and sensors are prime examples of such devices. All ILLUMRA™ products operate using the EnOcean protocol, which is the de-facto standard for energy-harvesting wireless controls. The technology allows energy harvesting ILLUMRA™ transmitters to operate indefinitely without the use of batteries. The motion of a switch actuation, light on a solar cell, or other ambient energy in the environment provide power to ILLUMRA™ transmitters, providing zero-maintenance wireless devices. The ILLUMRA™ product line includes multiple products which operate in the uncrowded 315 MHz band offering greater transmission range than other wireless technologies and minimal competitive traffic.

Given the energy-harvesting, wireless focus of products designed by Ad Hoc Electronics LLC, the minimization of power consumption in those products is essential. In spite of the fact that EnOcean PIR sensors are likely current state-of-the-art low power devices, they, like most other existing designs by other manufacturers, employ 2 amplifiers and 2 comparators. Estimated continuous power consumption of EnOcean's PIR sensors is estimated to be 5 to 10 μamps.

SUMMARY OF THE INVENTION

This present invention provides a passive infrared (PIR) motion detector having dramatically reduced power consumption compared with those of the prior art. The new PIR motion detector reduces the gain stages of the device to no more than one, eliminates the window comparator required by prior-art devices, and employs a much more sensitive processor to detect the signal from the PIR sensor. The signal from the PIR sensor is amplified by a single stage amplifier. As an example, if the processor wakes up once per second and measures the output of the amplifier, any change in the measurement is an indication of motion. In general, the output of the amplifier is periodically measured by a microcontroller and monitored for changes. Though unlikely, it is conceivable that a person moving through the room at a controlled speed would produce changes on the sensor only during the time between measurements. To prevent this situation, a peak detector circuit may be added in between the amplification stage and the processor. Changes that occur in between measurements will be captured by the peak detector, and subsequently provided to the processor at the next measurement time. The decay time of the peak detector is adjusted to be long enough so the signal does not decay before the next measurement. Not only does the peak detector circuit enhance reliability of detection, but it also enables even greater energy savings by allowing the detection signal to be stored during times while the microcontroller is in a sleep mode. Common low-power eight-bit microcontrollers draw 5 to 10 milliamps of current when awake and running at the full clock rate. However, when in sleep mode, they draw only 1-2 microamps. Some newer microcontrollers require about one-twentieth the power of the most efficient common low-power eight-bit microcontrollers—drawing as little as 50 nanoamps when in sleep mode. If the duty cycle is limited to 1 percent (awake only 10 milliseconds), and the full clock rate of the microcontroller is used for only a dozen or so microseconds, and slowed to a tiny fraction (i.e., 1/32) of the full clock rate during the remainder of the awake period, then an integration of current draw during consecutive sleep and awake cycles can be between 1 and 2 microamps. If the PIR sensor is being used in a circuit that wirelessly transmits signals which are coded to notify a remote receiver of a change in occupancy status, the transmission of those signals over an interval of 10 to 40 milliseconds may require a power expenditure that is considerably greater than the current draw of the microcontroller when fully awake. Thus, once a change is occupancy status is detected, the microcontroller can be programmed to suppress further signal processing for a fixed period of time so as to eliminate repetitious and unnecessary transmissions of signals which code for occupancy status. In addition, consecutive transmissions of status information can be spaced apart so that the transmitter draws current only when transmitting and the microcontroller is running at the much reduced clock rate. It should be understood that the microcontroller can be replaced by either a microprocessor or by a signal processor having low-power consumption, analog/digital inputs, variable-threshold comparator inputs, or delta-sigma modulator inputs. Some new microcontrollers, such as those manufactured by Silicon Labs of Austin, Tex. have up to 24-bit resolution for analog-to-digital conversion operations. That degree of accuracy is sufficient to eliminate not only the window comparator stage, but all amplification stages as well. If the signal processor employs a highly accurate analog-to-digital converter, the inherent sensitivity of the ADC itself effectively functions as a substitute for high-gain signal amplification stages, without the associated power consumption or component costs. PIR sensor devices constructed in that manner can achieve rates of continuous power consumption of less than 1 μamp. It should be understood that the sensor circuitry components are selected to minimize power consumption. In the case of the embodiment having a single amplification stage, this results in a lower signal bandwidth than traditional devices. However, the additional sensitivity provided by the microcontroller or signal processor makes the bandwidth reduction irrelevant to the operation of the system.

Although the invention is disclosed in the context of a low-power PIR sensor, the invention can also be applied to the sensing of change in capacitance of a touch-activated switch. It can also applied to detecting the state of a magnetic (reed switch or Hall-effect) sensor, light sensor, or thermoelectric junction. In addition to energy-harvesting wireless sensors, this PIR sensing circuit design can also be applied to a micropower wired sensor, where the sensor operates from a very small electrical current, sending the occupancy signal on the same wires from which it receives power. The low-power circuitry will allow such a device to operate with smaller loop currents, thereby saving energy.

DETAILED DESCRIPTION OF THE PREFERRED EMBODIMENT(S)

The various aspects of the invention will be now be described in detail with reference to the attached drawing figures. Drawing FIGS. 2 through 4.

Figure 1:
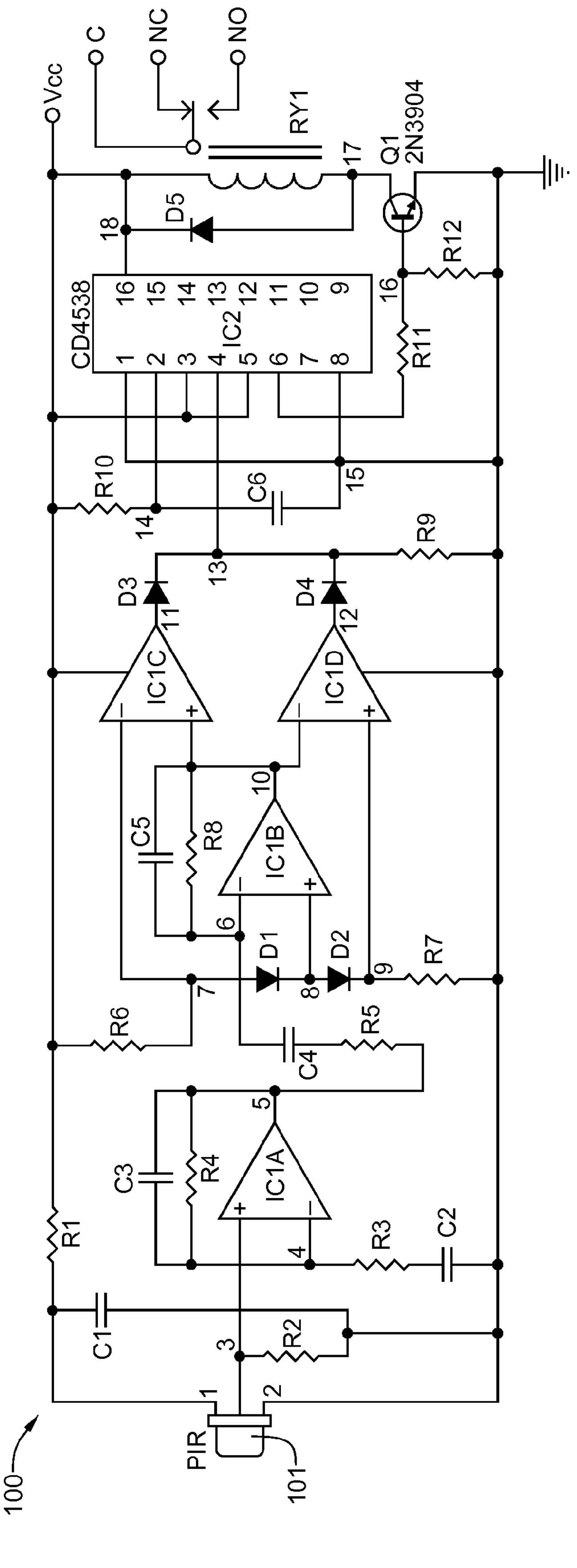
FIG. 1 (PRIOR ART)
FIG. 1 is a diagram of typical prior art general purpose motion detector circuit.
Figure 2:
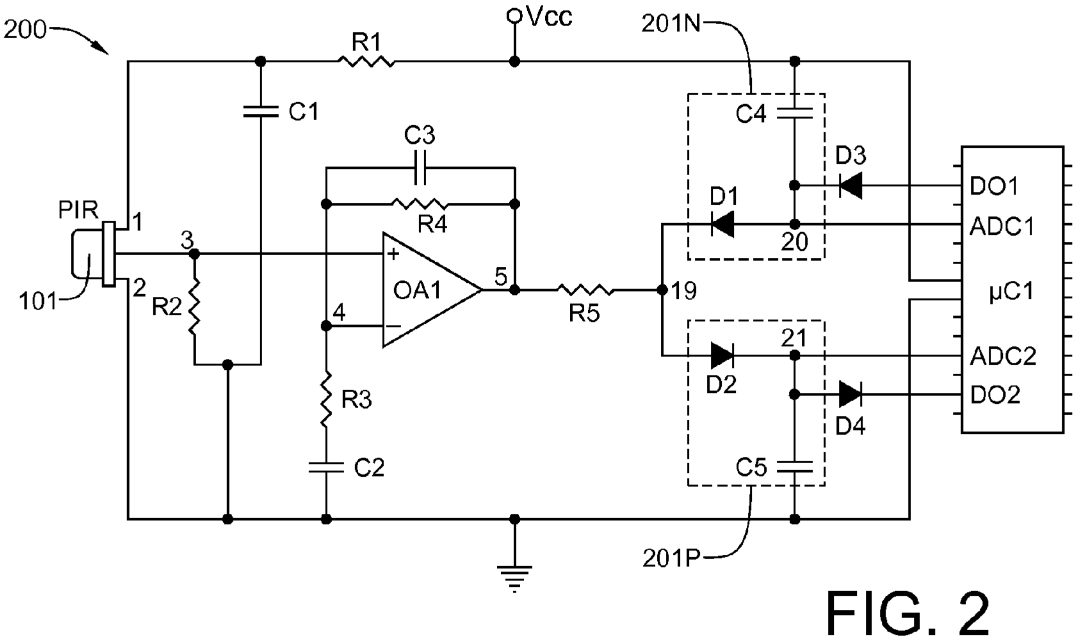
FIG. 2 is a diagram of a motion detector circuit having only one amplification stage, a peak detector, and a microcontroller with both analog-to-digital conversion and digital outputs for node recharge.

Referring now to FIG. 2, a first embodiment motion detector circuit 200, assembled in accordance with the present invention, includes a PIR sensor 201, Suggested component values are as follows: R1=10KΩ; R2=100KΩ; R3=10KΩ; R4=1 MΩ; R5=1 MΩ; C1=10 μf; C2=10 μf; C3=0.1 μf; C4=10 μf; and C5=10 μf. The front end of circuit 200 is functionally identical to the prior art motion detector circuit 100 of FIG. 1 up to the output of the first amplification stage, with the exception that a quad operational amplifier is not used. PIR sensor 101 is connected directly to ground through terminal 2. It is also connected to Vcc at terminal 1. C1 and R1 act as filters between the PIR sensor 101 and Vcc, as even tiny fluctuations in Vcc could perturb the PIR sensor, thereby causing output fluctuations that might well result in false occupancy detection. R2 continually pulls node 2 toward ground so that drops in the sensor output can be sensed by op-amp OA1, which has a gain of about 100. As long as PIR sensor 101 detects no change in IR radiation intensity, op-amp OA1 is in a steady state condition, with the voltages at nodes 3, 4 and 5 being roughly equal to the approximately 1-volt output voltage of the sensor 101. However, when the voltage on node 3 changes in response to a change in detected IR radiation intensity by sensor 101, node 5 will reflect a 100-fold signal gain as OA1 attempts to equalize the voltage at nodes 3 and 4. The gain at node 5 is set by the ratio of R3 to R4, which together form a voltage divider. When the node 5 output of op-amp OA1 rises above or falls below the steady state value, that change is transferred to node 19 through resistor R5, which prevents the output from op-amp OA1 from being either shorted to ground when node 21 is reset to ground potential or connected to Vcc after the voltage levels on nodes 20 and 21 are read by microcontroller μC1 upon awakening after a period of sleep. The components C4 and D1 in box 201N function as a negative peak detector, while the components C5 and D2 in box 201P function as a positive peak detector. Capacitors C4 and C5 are sequentially set to Vcc and ground potential, respectively, after the microcontroller μC1 has read the voltage levels on nodes 20 and 21 by the digital outputs DO1 and DO2, respectively. The capacitance of capacitors C4 and C5 is selected so that nodes 20 and 21 can remain at nearly full charge during the sleep period between successive awake periods. If the potential at node 19 is more than a threshold voltage above the voltage level on node 21, current will flow through diode D2, thereby raising the voltage on that node above ground potential. Likewise, if the voltage on node 19 drops more than a threshold voltage below the voltage level on node 20, current will flow through diode D1 to node 19, thereby reducing the voltage level on node 20. Any changes in the voltage levels at nodes 20 and 21 is converted to a digital signal at either input ADC1 or input ADC2. The microcontroller μC1 determines whether the digital values have changed sufficiently to indicate a change in occupancy status at the sensor 101. It should be understood that it is possible that both nodes 20 and 21 may have changed if the output from PIR sensor 101 both rises above and falls below the steady state value during the sleep period of microcontroller μC1.

Figure 3:
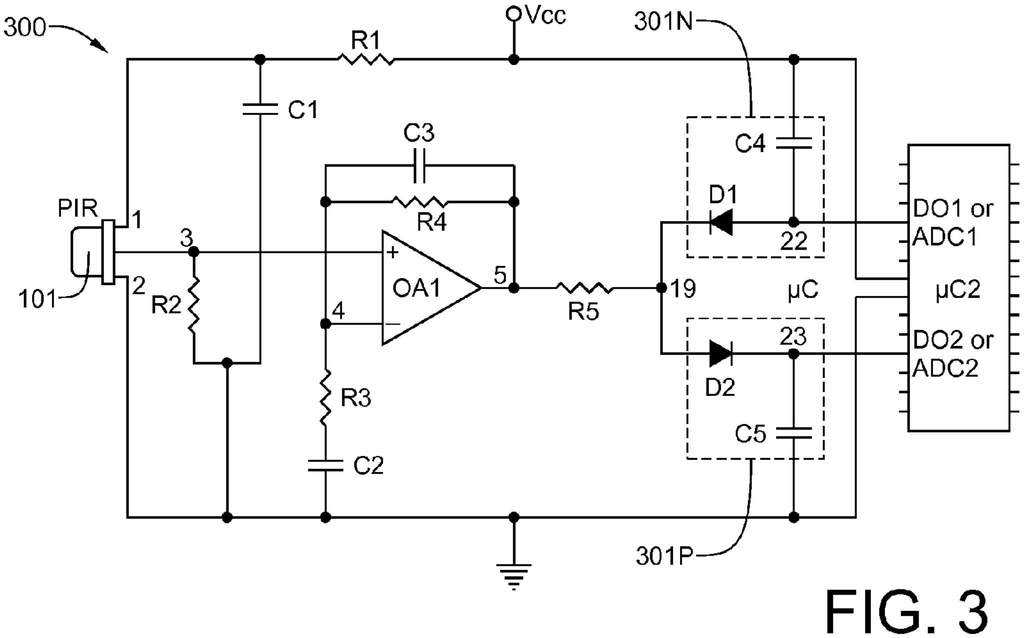
FIG. 3 is a diagram of a motion detector circuit having only one amplification stage, a peak detector, and a microcontroller with software-configurable I/O terminals that can function as both analog inputs for analog-to-digital conversion, as well as digital outputs for node recharge.

Referring now to FIG. 3, a second embodiment motion detector circuit 300, assembled in accordance with the present invention, functions identically to the first embodiment circuit of FIG. 2, with the exception the microcontroller μC2 has software-configurable I/O terminals that can function as both analog inputs for analog-to-digital conversion, as well as digital outputs for recharging of nodes 22 and 23. The components C4 and D1 in box 301N function as a negative peak detector, while the components C5 and D2 in box 301P function as a positive peak detector.

Figure 4:
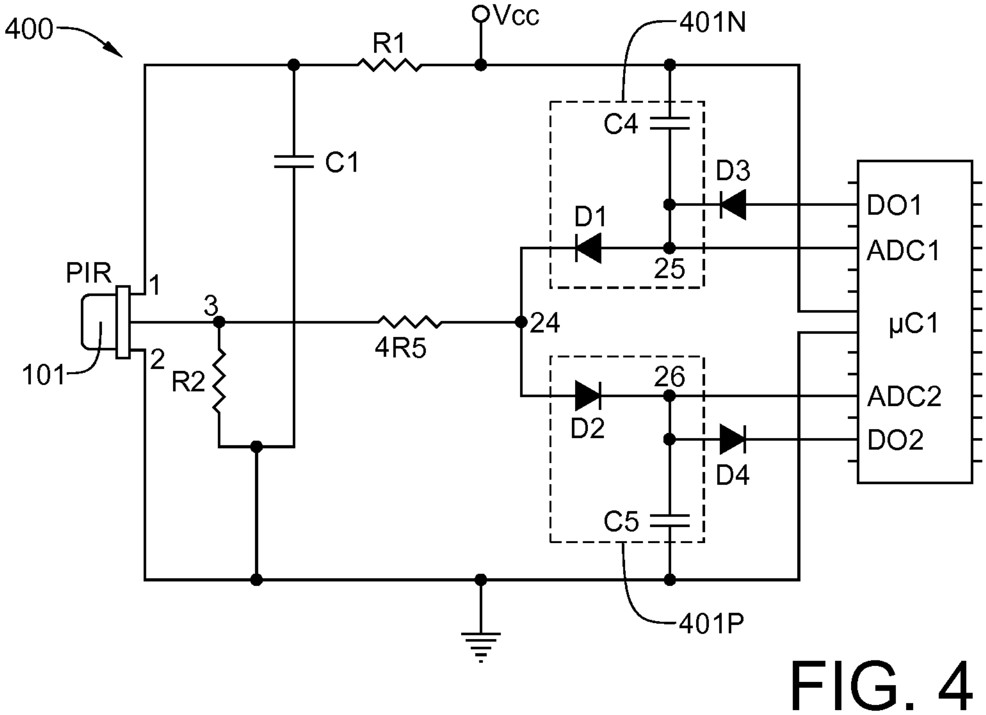
FIG. 4 is a diagram of a motion detector circuit having no amplification stage, a peak detector, and a microcontroller with both analog-to-digital conversion and digital outputs for node recharge.

Referring now to FIG. 4, a third embodiment motion detector circuit 400, assembled in accordance with the present invention, functions similarly to the first embodiment circuit of FIG. 2, with the exception that the amplification stage comprised of op-amp OA1 has been eliminated. In order to detect fluctuations from the steady state voltage level at node 22, which is proportional to the output of the PIR sensor 101 at node 3, microcontroller μC3 can measure voltage levels with a high degree of accuracy by providing 24-bit resolution for analog-to-digital conversions from the analog inputs at ADC1 and ADC2. As with the circuit 200 of FIG. 2, nodes 24 and 25 are set to Vcc and ground potential at the end of each awake period of the microcontroller. The components C4 and D1 in box 401N function as a negative peak detector, while the components C5 and D2 in box 401P function as a positive peak detector.

Figure 5:
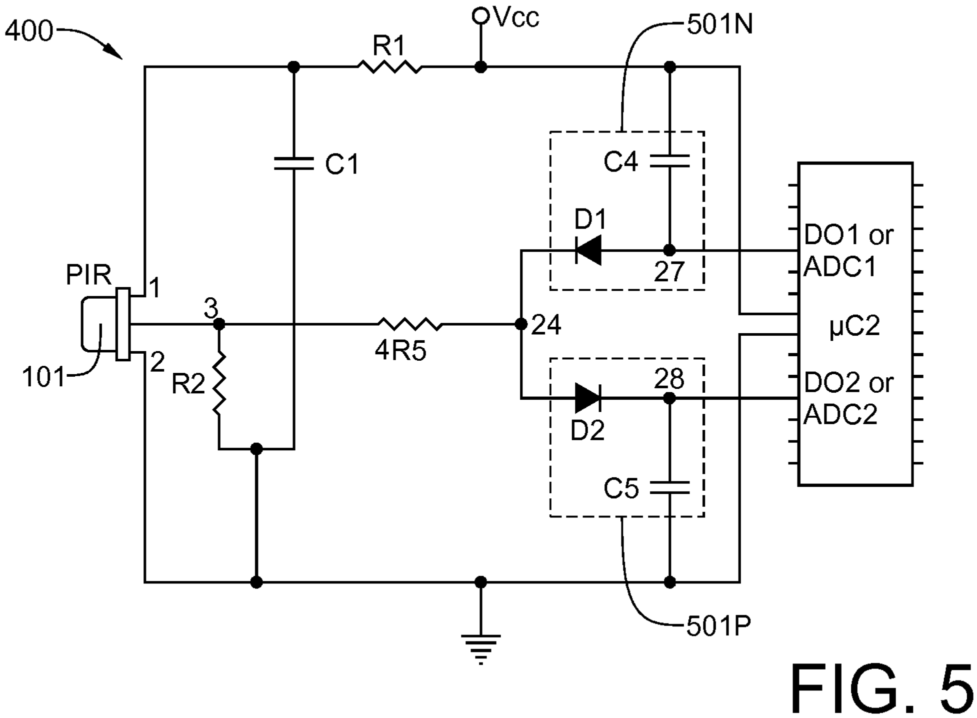
FIG. 5 is a diagram of a motion detector circuit having no amplification stage, a peak detector, and a microcontroller with software-configurable I/O terminals that can function as both analog inputs for analog-to-digital conversion, as well as digital outputs for node recharge.

Referring now to FIG. 5, a fourth embodiment motion detector circuit 500, assembled in accordance with the present invention, functions identically to the third embodiment circuit of FIG. 4, with the exception the microcontroller μC4 has software-configurable I/O terminals that can function as both analog inputs for analog-to-digital conversion, as well as digital outputs for recharging of nodes 26 and 27. The components C4 and D1 in box 501N function as a negative peak detector, while the components C5 and D2 in box 501P function as a positive peak detector.

It should be understood that microcontrollers μC1, μC2, and μC3 are not intended to be of any particular brand or of any particular manufacturer. The pinout is intended to be only exemplary and may not represent the actual pinout of any particular processor in production. In spite of the foregoing disclaimer, the Atmel AT Mega168PA is a microcontroller that possesses the attributes required to implement most, if not all, of the embodiments of the present invention. It should also be understood that the microcontroller μC1 or the microcontroller μC2 can be replaced by either a microprocessor or by a signal processor having low-power consumption, analog/digital inputs, variable-threshold comparator inputs, or delta-sigma modulator inputs. As these types of processor units are interchangeable as long as they have compatible specifications, they are generally referred to as processor units in the attached claims. It should be further understood that the peak detection circuitry, which is shown in the drawings as including both a positive peak detector and a negative peak detector, is considered an optional, though desirable feature of the invention. The output of the passive infrared sensor may be input directly, with or without amplification to the processor unit.

Although only several embodiments of the invention have been described herein, it should be obvious to those having ordinary skill in the art that changes and modifications may be made thereto without departing from the scope and the spirit of the invention as hereinafter claimed.

What is claimed is:

1. An occupancy sensor comprising:

a passive infrared sensor, which provides a first output in response to infrared radiation impinging thereon;

an amplifier, which receives said first output, said amplifier providing a second output as a function of said first output;

a processor unit, which receives said second output and converts it to a digital value using an analog-to-digital converter for further processing and analysis by the processor for the purpose of determining whether or not said second output is indicative of a change in occupancy status; and at least one peak detector interposed between said one amplifier and said processor unit, each of said at least one peak detector storing a voltage value corresponding to a maximum infrared radiation level detected during periods when said processor unit is operating in a sleep mode, said stored voltage value being provided as an analog input to said processor unit.

2. The occupancy sensor of claim 1, which further comprises both positive and negative peak detectors interposed between said amplifier and said processor unit, said positive peak detector storing a first voltage value corresponding to maximum infrared radiation levels detected during periods when said processor unit is operating in said sleep mode, said negative peak detector storing a second voltage value corresponding to minimum infrared radiation levels detected during periods when said processor unit is operating in said sleep mode, said first and second voltage values being provided to said processor unit as analog inputs.

3. The occupancy sensor of claim 1, wherein said second output is resistively coupled to an input of said peak detection circuitry.

4. The occupancy sensor of claim 2, wherein operating characteristics of said positive and negative peak detectors are selected so that a signal decay rate in each peak detector is insufficient to attenuate the peak signal in each detector during processor unit sleep mode intervals.

5. The occupancy sensor of claim 1, wherein current used to power said passive infrared sensor is filtered to smooth current fluctuations that would otherwise distort said first output and generate false occupancy determinations.

6. The occupancy sensor of claim 5, wherein the current used to power said passive infrared sensor is both capacitively and resistively filtered.

7. An occupancy sensor comprising:

a passive infrared sensor, which provides a first output in response to infrared radiation impinging thereon;

a processor unit, which receives said first output and converts it to a digital value using an analog-to-digital converter for further processing and analysis by the processor for the purpose of determining whether or not said first output is indicative of a change in occupancy status; and peak detection circuitry interposed between said passive infrared sensor and said processor unit, said peak detection circuitry storing at least one voltage value corresponding to a peak infrared radiation level detected during periods when said processor unit is operating in a sleep mode, said at least one stored voltage value being provided as an analog input to said processor unit.

8. The occupancy sensor of claim 7, wherein said peak detection circuitry comprises both positive and negative peak detectors, said positive peak detector storing a first voltage value corresponding to maximum infrared radiation levels detected during periods when said processor unit is operating in said sleep mode, said negative peak detector storing a second voltage value corresponding to minimum infrared radiation levels detected during periods when said processor unit is operating in said sleep mode, said first and second voltage values being provided to said processor unit as analog inputs.

9. The occupancy sensor of claim 8, wherein operating characteristics of said positive and negative peak detectors are selected so that a signal decay rate in each peak detector is insufficient to attenuate the peak signal in each peak detector during processor unit sleep mode intervals.

10. The occupancy sensor of claim 7, wherein current used to power said passive infrared sensor is filtered to smooth current fluctuations that would otherwise distort said first output and generate false occupancy determinations.

11. The occupancy sensor of claim 10, wherein the current used to power said passive infrared sensor is both capacitively and resistively filtered.

12. The occupancy sensor of claim 7, which further comprises an amplifier interposed between said passive infrared sensor and said peak detection circuitry.

13. The occupancy sensor of claim 12, wherein an output from said amplifier is resistively coupled to an input of said peak detection circuitry.

14. An occupancy sensor comprising:

a passive infrared sensor, which provides a first output in response to infrared radiation impinging thereon;

an amplifier, which receives said first output, said amplifier providing a second output as a function of said first output;

peak detection circuitry which receives said second output from said amplifier, said peak detection circuitry storing at least one voltage value corresponding to a peak infrared radiation level detected during periods when said processor unit is operating in a sleep mode, said at least one stored voltage value being provided as an analog input to said processor unit; and a processor unit, which receives said second output and converts it to a digital value using an analog-to-digital converter for further processing and analysis by the processor for the purpose of determining whether or not said second output is indicative of a change in occupancy status.

15. The occupancy sensor of claim 14, wherein said peak detection circuitry comprises both positive and negative peak detectors interposed between said amplifier and said processor unit, said positive peak detector storing a first voltage value corresponding to maximum infrared radiation levels detected during periods when said processor unit is operating in said sleep mode, said negative peak detector storing a second voltage value corresponding to minimum infrared radiation levels detected during periods when said processor unit is operating in said sleep mode, said first and second voltage values being provided to said processor unit as analog inputs.

16. The occupancy sensor of claim 15, wherein operating characteristics of said positive and negative peak detectors are selected so that a signal decay rate in each peak detector is insufficient to attenuate the peak signal in each peak detector during processor unit sleep mode intervals.

17. The occupancy sensor of claim 14, wherein said second output is resistively coupled to an input of said peak detection circuitry.

18. The occupancy sensor of claim 14, wherein current used to power said passive infrared sensor is filtered to smooth current fluctuations that would otherwise distort said first output and generate false occupancy determinations.

19. The occupancy sensor of claim 18, wherein the current used to power said passive infrared sensor is both capacitively and resistively filtered.

* * * * *